Nov. 19, 1935.  D. P. BEAMER  2,021,250

INDICATOR FOR AIRCRAFT

Filed March 31, 1934   5 Sheets-Sheet 1

Inventor
Donald P. Beamer

By Clarence A. O'Brien
Attorney

Nov. 19, 1935.  D. P. BEAMER  2,021,250
INDICATOR FOR AIRCRAFT
Filed March 31, 1934  5 Sheets-Sheet 2
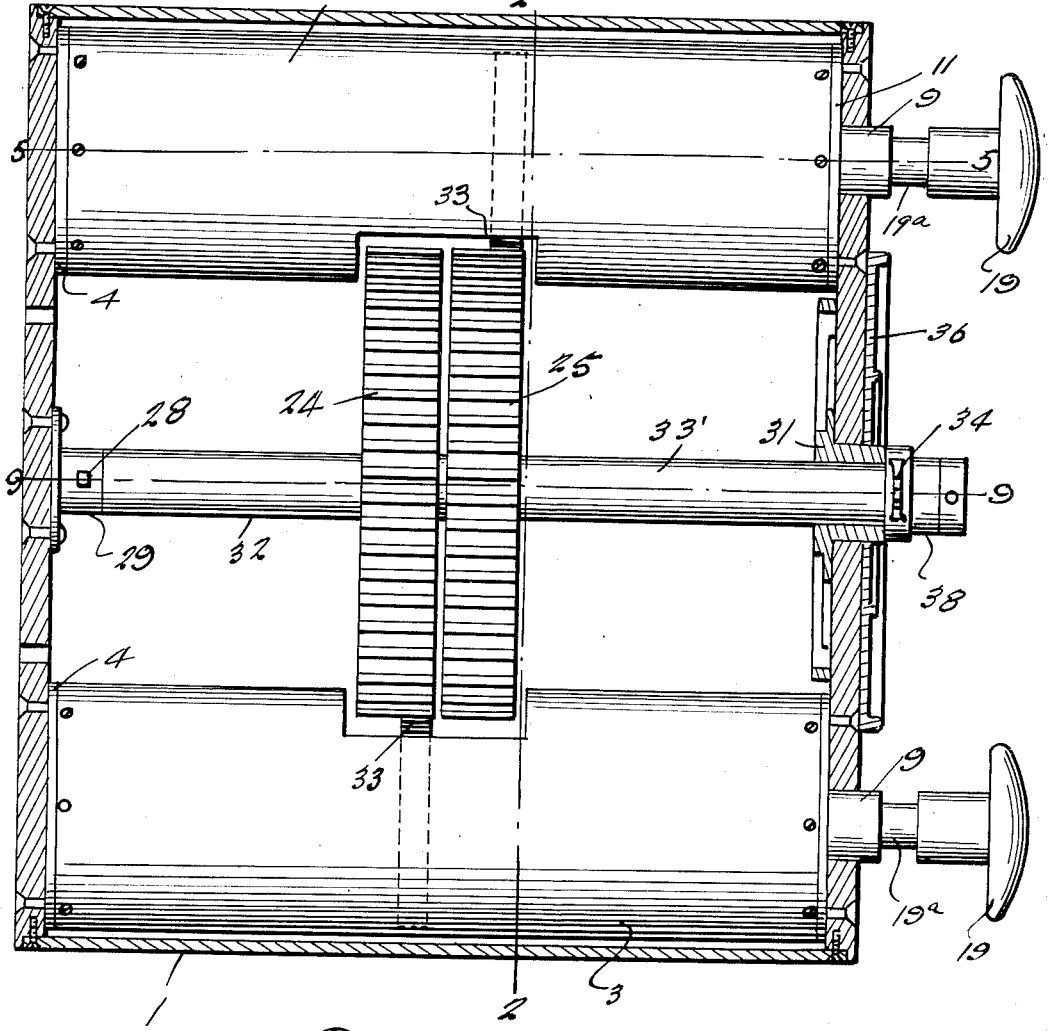
Inventor
Donald P. Beamer
Attorney Nov. 19, 1935.        D. P. BEAMER        2,021,250
INDICATOR FOR AIRCRAFT
Filed March 31, 1934        5 Sheets-Sheet 3
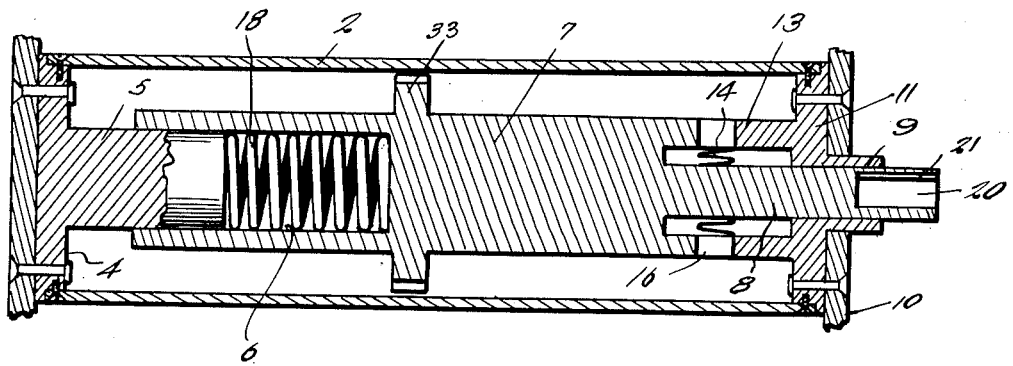
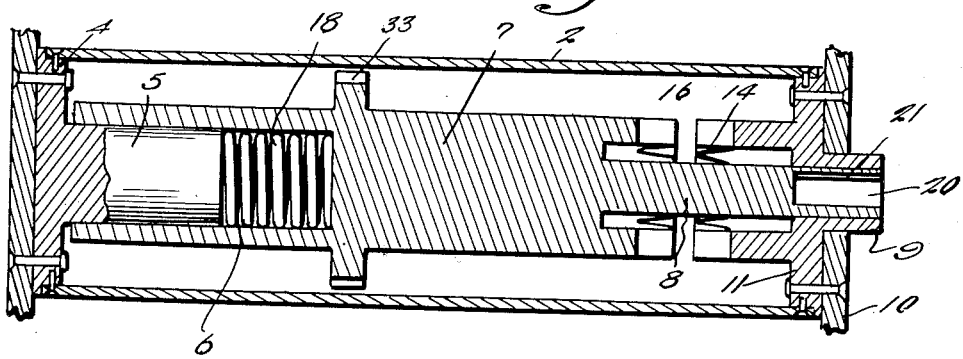
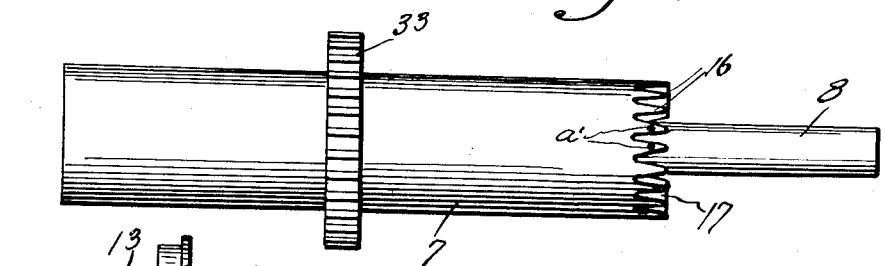
Inventor
Donald P. Beamer
By Clarence A. O'Brien
Attorney Nov. 19, 1935. D. P. BEAMER 2,021,250
INDICATOR FOR AIRCRAFT
Filed March 31, 1934  5 Sheets-Sheet 4
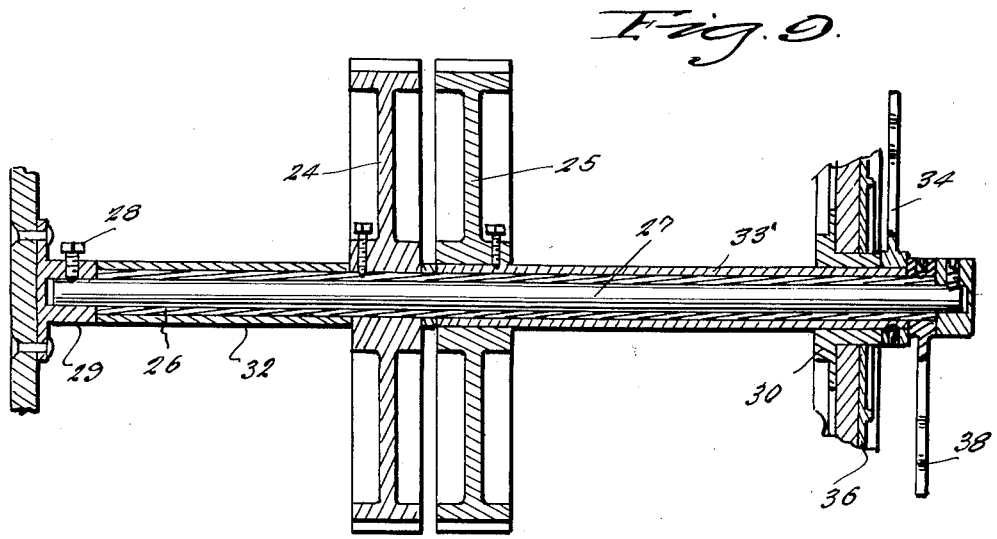
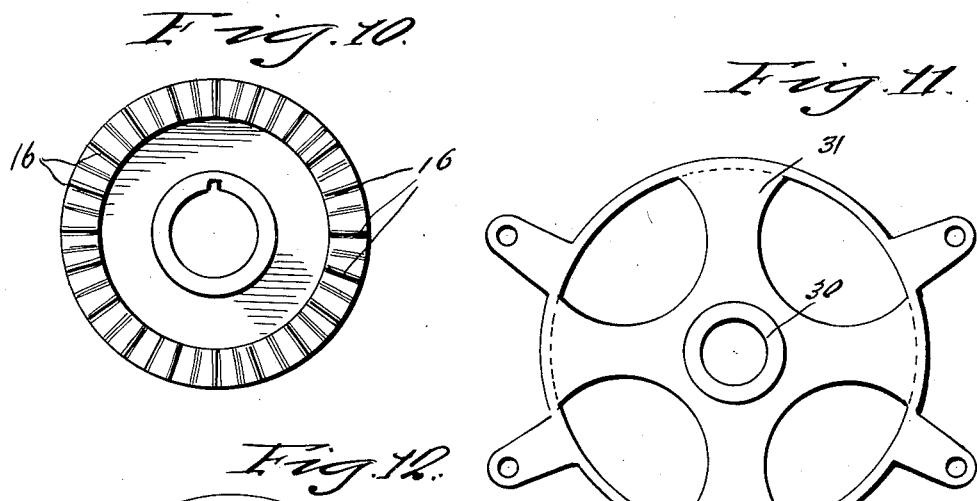
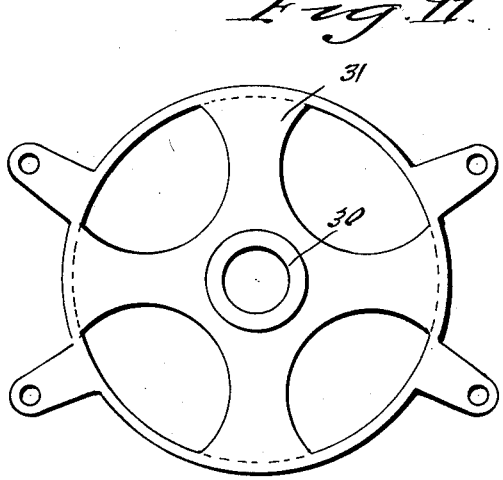
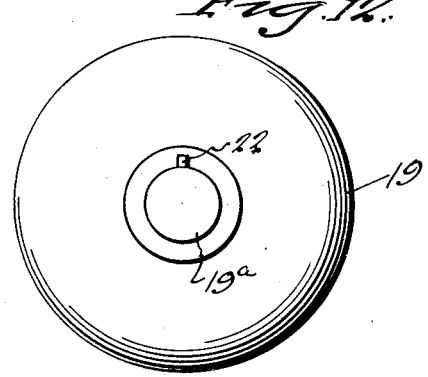
Inventor
Donald P. Beamer
By Clarence A. O'Brien
Attorney Nov. 19, 1935.  D. P. BEAMER  2,021,250
INDICATOR FOR AIRCRAFT
Filed March 31, 1934  5 Sheets-Sheet 5
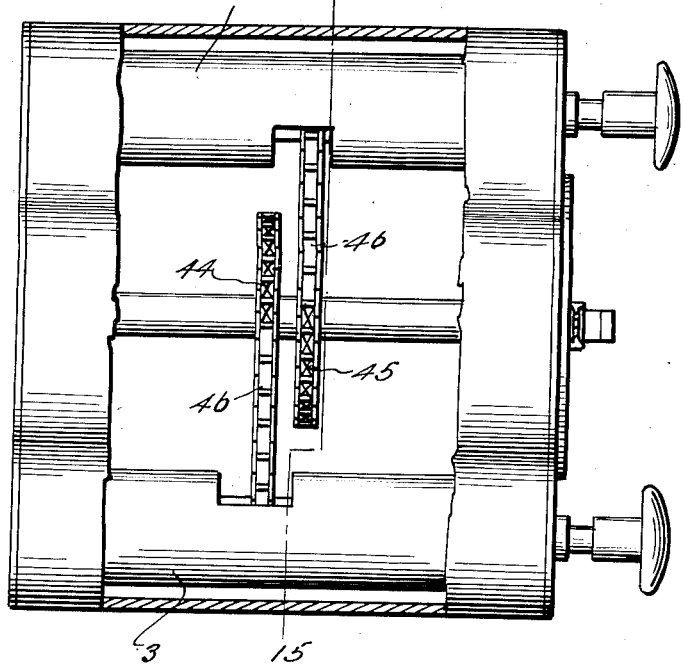
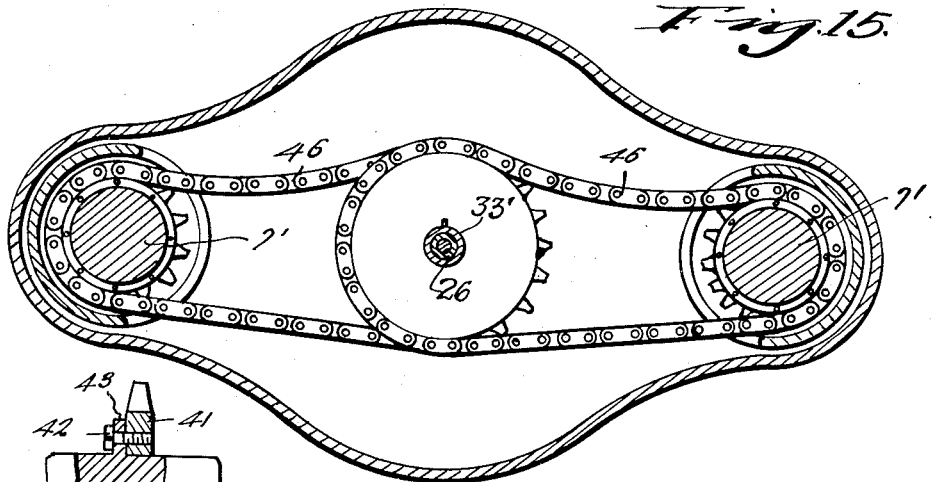
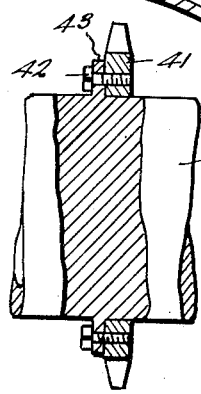
Inventor
Donald P. Beamer
By Clarence A. O'Brien
Attorney Patented Nov. 19, 1935

2,021,250

UNITED STATES PATENT OFFICE 2,021,250

INDICATOR FOR AIRCRAFT

Donald P. Beamer, Uniontown, Pa.

Application March 31, 1934, Serial No. 718,477

9 Claims. (Cl. 116—129)

As is well known after an aircraft disaster much investigation and speculation is made in an endeavor to ascertain the cause, and especially where there is no survivor this sought for information is never uncovered and left solely to speculation.

An object of the present invention is to provide a device which upon the development of trouble the pilot may set and which will remain as a medium for aiding investigators in determining the cause of a particular aeroplane or other aircraft disaster.

A further object of the invention is to provide a device of this character which can be economically constructed and operated and which will prove efficient for the purpose intended.

The invention together with its objects and advantages will be best understood from a study of the following description taken in connection with the accompanying drawings wherein:

Figure 3 is a horizontal sectional view through the device with certain parts shown in elevation.

Figure 4 is an elevational view of one of the handles or knobs.

Figure 5 is a sectional view taken substantially on the line 5—5 of Figure 3 with the parts in one position.

Figure 6 is a view similar to Figure 5 with the parts in a second position.

Figure 7 is a plan view of a shaft to be hereinafter more fully referred to.

Figure 8 is a plan view of a locking member.

Figure 9 is a longitudinal sectional view taken substantially on the line 9—9 of Figure 3.

Figure 10 is an end elevational view of the shaft shown in Figure 7.

Figure 11 is a plan view of a bearing.

Figure 12 is an end elevational view of the knob or handle shown in Figure 4.

Figure 14 is a plan view of a slightly modified form of the invention, certain parts being broken away.

Figure 15 is a sectional view taken substantially on the line 15—15 of Figure 14, and Figure 16 is a fragmentary view partly in section and partly in elevation showing the manner of securing a sprocket to one of the shafts.

Figure 1:
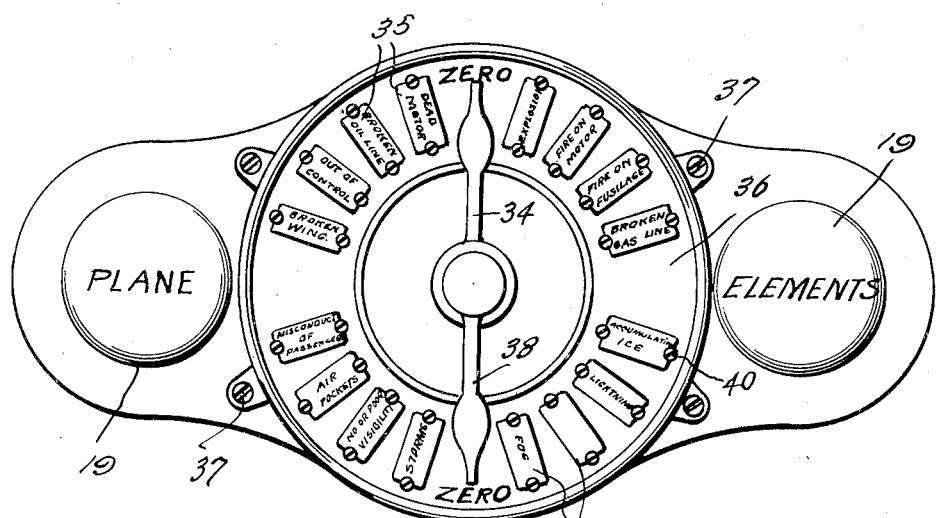
Figure 1 is an elevational view of the device.
Figure 2:
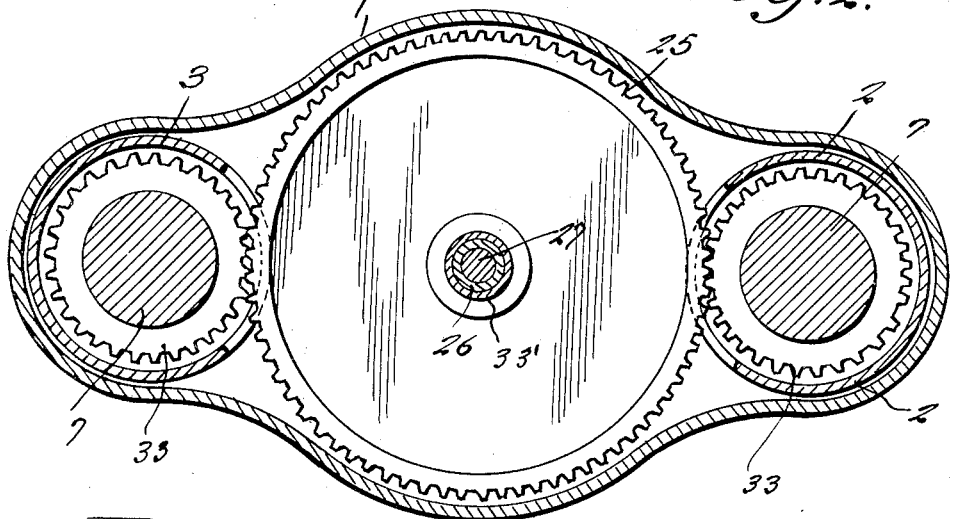
Figure 2 is a sectional view taken substantially on the line 2—2 of Figure 3.

Referring to the drawings by reference numerals it will be seen that the device comprises a casing 1 of suitable shape and construction and suitably mounted within the casing are opposed parallel cylindrical shells 2, 3.

Within each of the shells 2, 3 there is secured at one end of the shell a disk 4 having a cylindrical projection 5 that is slidably received within the socket 6 of a shaft 7. At the end thereof remote from the socket 6 the shaft 7 is provided with a reduced extension 8 that is journalled in a bearing 9 provided in the front wall 10 of casing 1. The bearing 9 as clearly shown in Figure 5 is formed integral with one side of a disk or plate 11 that is secured within the adjacent end of the shell, and which is provided on the side thereof opposite to the bearing 9 with a cylindrical locking member 13. The locking member 13 is provided on its free end with a series of alternating fingers or lugs 14 and notches or recesses 15.

The enlarged end of the shaft 7 confronting the member 13 is similarly formed to provide alternating fingers or projections 16 and notches or recesses 17 for interfitting engagement with the fingers 14 and recesses 15 of the member 13 whereby the shaft 7 is releasably secured against casual rotation. The stated ends of the shaft 7 and the member 13 are normally engaged one with the other through the medium of a suitable coil spring 18 arranged within the socket 6 of shaft 7 in a manner clearly shown in Figures 5 and 6.

For each shaft 7 there is provided a handle or knob 19 provided with a stem having a reduced portion 19a slidably received in a socket 20 provided in the end 8 of the shaft 7. Socket 20 is provided with a way 21 with which is engaged a key 22 provided on the end 19a of the stem of knob 19.

The shafts 7 are provided intermediate their ends with gears 23 in constant mesh respectively with gears 24, 25. As clearly shown in Figure 9 gear 24 is secured on an inner tubular shaft 26 that is rotatable about a fixed rod 27 extending longitudinally of the casing 1 between the shells 2 and 3. As will be noted one end of the shaft 27 is secured by a set screw 28 within a socket 29 secured to the rear wall of the casing 1. The other end of the shaft 27 extends through an opening in the front wall of the casing 1, and axially through a bearing 30 forming the hub of a spider 31, which spider is secured or mounted on the inner side of the front wall of casing 1. Interposed between the hub of the gear 24 and the socket 29 is a spacer sleeve or tube 32.

The gear 25 is secured to one end of a tubular shaft 33' that fits on the tubular shaft 26 and rotates about said shaft as an axis. The shaft 33' extends through the bearing 30 and at its outer end is provided with an index hand or pointer 34.

The index hand or pointer 34 is adapted to be read against an arcuate series of indicia plates 35 detachably secured to the upper half of a dial plate 36 mounted externally of the casing 1 and on the front wall of the casing. The dial 36 as well as the aforementioned spider 31 are provided with attaching ears whereby said dial 36 and spider 31 are secured in position by bolts or other suitable fastening devices 37.

As also shown in Figure 9 there is secured to the outer end of the inner tubular shaft 26 an index hand or pointer 38 that is movable across or readable against an arcuate series of indicia plates 35a secured to the dial 36 at the lower half of the dial.

Figure 13:
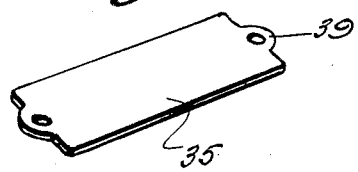
Figure 13 is a perspective view of an indicia plate.

As shown in Figure 13 each indicia plate 35, 35a is of any suitable form, preferably rectangular, and may be made of metal or other suitable material. Each plate at the ends thereof is equipped with attaching ears 39 whereby through the medium of screws or other fastening elements 40 these plates are secured in proper position.

As suggested the upper series of plates 35 may have legends thereon germane or appertaining to elements entering into the construction of an aeroplane and with reference to the condition of such elements. The lower series of plate 35a may carry such indicia as would give an idea of conditions of flight, as for example some idea as to the conduct of the passengers, or with reference to the elements, as to whether or not fog has been encountered or air pockets or the like. In this connection, and as shown in Figure 1, the knobs 19 are provided with suitable indicia so that the operator may know which knob to grasp for operating either the pointer 38 or 34. Thus to place the pointer 34 opposite a desired one of the places 35 the knob at the left of Figure 1 and bearing the legend "plane" would be manipulated while the knob at the right of Figure 1 and bearing the legend "element" would be manipulated for moving the index 38 opposite to the selected indicia plate 35a. As is thought apparent the indexes 34, 38 are normally in the zero positions suggested in Figure 1.

Assuming that it is desired to move the index 34 opposite the plate 35 bearing the legend "broken oil line". The operator would first grasp the knob 19 bearing the legend "plane". By pushing inwardly on the knob shaft 7 associated therewith would be moved from the position shown in Figure 5 to the position shown in Figure 6, or to the released position. The knob is then rotated in a clockwise direction with the result that through the intermeshing gearing 33 and 24 shaft 26 will be rotated in an anti-clockwise direction causing the index 34 to swing in a corresponding direction across the face of the dial. When the hand or index 34 is opposite the selected indicia plate 35 the operator releases his grip on the knob 19 aforementioned. With the knob thus released spring 18 will act on the shaft 7 to shift the same from the position shown in Figure 6 to the position shown in Figure 5 for engaging the notches 17 and fingers 16 on the end of the shaft 7 with the notches 15 and fingers 14 on the member 13 alined with said shaft. Thus it will be apparent that the index 34 will be secured in proper indicating position. Obviously should disaster befall the aeroplane before a change is made in the position of the index 34 the investigator would have the knowledge at hand as to the fact that, in this instance, broken oil lines had impaired the flight, and he would then be in a better position to begin to make investigation productive of result.

The manipulation of the index 38 is thought to be apparent from the above.

As will be thought apparent instead of providing the gearing 33, 24 and 25 the same result will be obtained by equipping each of the shafts 7' with a sprocket 41 secured as at 42 to a flange 43 provided intermediate the ends of the shaft 7'; and by providing sprockets 44 and 45 respectively on the shafts 26 and 33' respectively; and with chains 46 suitably trained over the sprockets in a manner to transmit movement from a shaft 7' to the proper shaft 26 or 33' as the case may be.

It will be of course understood, and as clearly shown in the drawings, that each of the shells 2, 3 have portions cut away or notched to accommodate, in the first form of the invention the gearing, and in the second form of the invention the chain and sprocket mechanism.

As clearly suggested in Figures 7 and 8 provision is also made to guarantee information concerning the cause of the aeroplane or aircraft disaster, regardless of whether or not the face or dial 36 is melted, burned or torn away. To this end it will be seen that on a predetermined one of the teeth 14 of the lock barrel 13 there is provided an indicium element $a$ while similar indicia $a'$ are provided on two adjacent predetermined teeth 16 of each shaft 7. When either or both of the points 34, 38 are in zero position the tooth on the proper lock barrel 13 provided with the indicium $a$ is engaged between the teeth on the corresponding shaft 7 equipped with the indicia $a'$. In the event the dial 36 is destroyed as suggested above, by the use of the indicia $a$, $a'$, it will be possible to check the cause of the disaster by the relative position of the shaft 7 relative to the lock barrel 13. In actual practice the teeth on each lock barrel 13 will in all probability be graduated so as to correspond with the dial setting, that is with the arrangement of the indicia plates 35, 35a. In this connection it is intended to have these devices uniform in practice, and so operated that in case of disaster and defacement of the dial 36, a master record of dial positions could be taken to the scene of the disaster and by comparison of the master record and the position of the indicia $a$, $a'$ the investigator would be enabled to locate the corresponding position on the face of the recorder, as had been originally set by the pilot and thereby determine the cause of the disaster.

From the above it will be apparent that an instrument of this character will practically guarantee a record of the pilot's original setting indicating the difficulty encountered. Such a device of course will be so constructed and designed as to withstand shock in case of crash and also intense heat in case of fire.

Having thus described my invention, what I claim as new is:

1. In an indicator of the character described a dial having an upper and lower series of indicia plates, a pointer movable over the face of the dial and adapted to be read against the plates of one series, a second pointer movable over the face of the dial and adapted to be read against the plates of the other series, and means for operating each pointer separate and independently of the other pointer, said means including a shaft for each pointer, a second shaft mounted in parallelism to the first named shaft, means supporting the second shaft for rotative and axial sliding movement, driving means connecting said shafts in all positions of the second shaft, and manual means for rotating the second shaft.

2. An indicator for the purpose specified comprising a dial, an index movable over the face of the dial, a shaft on which the index is mounted, a second shaft mounted parallel to the first named shaft, supporting means for the second shaft whereby the latter is supported for rotative and sliding movement, an operating connection between the shafts operatively connecting said shafts for all positions of the second shaft, said second shaft being provided at one end with a circular series of alternating fingers and notches, a fixed member alined with the second shaft and provided with a circular series of alternating fingers and notches with which the fingers and notches of the second shaft are engageable for releasably retaining the second shaft against rotation, and manual means connected with the second shaft for sliding the same in one direction to release said second shaft, and for rotating the second shaft to move the index over the face of the dial.

3. An indicator for the purpose specified comprising a dial, an index movable over the face of the dial, a shaft on which the index is mounted, a second shaft mounted parallel to the first named shaft, supporting means for the second shaft whereby the latter is supported for rotative and sliding movement, an operating connection between the shafts operatively connecting said shafts for all positions of the second shaft, said second shaft being provided at one end with a circular series of alternating fingers and notches, a fixed member alined with the second shaft and provided with a circular series of alternating fingers and notches with which the fingers and notches of the second shaft are engageable for releasably retaining the second shaft against rotation, and manual means connected with the second shaft for sliding the same in one direction to release said second shaft, and for rotating the second shaft to move the index over the face of the dial, and means acting on the second shaft for yieldably retaining said shaft and said member interengaged; and said dial including a plate and a series of indicia plates removably mounted on the dial plate.

4. An indicator for the purpose specified comprising a dial, an index movable over the face of the dial, a shaft on which the index is mounted, a second shaft mounted parallel to the first named shaft, supporting means for the second shaft whereby the latter is supported for rotative and sliding movement, an operating connection between the shafts operatively connecting said shafts for all positions of the second shaft, said second shaft being provided at one end with a circular series of alternating fingers and notches, a fixed member alined with the second shaft and provided with a circular series of alternating fingers and notches with which the fingers and notches of the second shaft are engageable for releasably retaining the second shaft against rotation, and manual means connected with the second shaft for sliding the same in one direction to release said second shaft, and for rotating the second shaft to move the index over the face of the dial, and indicia on predetermined fingers respectively of said second shaft and said fixed member whereby in the event of mutilation of the dial the setting of the indicator prior to a disaster may be ascertained by the angular position of the second shaft relative to said fixed member.

5. In an indicator of the character described a dial having two separate series of indicia thereon, a pointer movable over the face of the dial and adapted to be read against one series of indicia, a second pointer movable over the face of the dial and adapted to be read against the second series of indicia, and means for operating each pointer separate and independently of the other pointer, said means including means independently of the dial and pointer for indicating the position of a pointer at about the time of any mutilation of the dial.

6. In an indicator of the character described, a dial, a pointer movable over the face of the dial, and actuating means for the pointer including means for indicating the position of the pointer without reference to the dial.

7. An indicator for the purpose specified comprising a dial, a pointer movable over the face of the dial, a shaft on which the pointer is mounted, and mechanism for rotating the shaft to move the pointer over the face of the dial including a second shaft having driving engagement with the first shaft, said second shaft being provided at one end with a circular series of alternating fingers and notches, a fixed member aligned with the second shaft and provided with a circular series of alternating fingers and notches with which the fingers and notches of the second shaft are engageable for releasably retaining the second shaft against rotation, said second shaft being slidable toward and away from said fixed member, and indicia on predetermined fingers respectively of said second shaft and fixed member for use in approximately indicating the angular position of the pointer without reference to the dial or pointer.

8. In an indicator for aircraft, a dial having indicia thereon of legendary character germane to aircraft structure and flight conditions, index means movable over the face of the dial and adapted to be read in conjunction with such indicia, and mechanism for actuating said index means including auxiliary indicia separate and apart from the dial and index means.

9. An indicator of the class described, comprising a casing, a dial on the front of the casing, a pointer movable over the face of the dial, a shaft carrying the pointer and extending into the casing, mechanism located in the casing for rotating the shaft, manual means at the front of the casing and connected with such mechanism for actuating the same, and means within the casing and associated with the mechanism for indicating the various adjustments of the mechanism in adjusting the pointer to various positions on the dial.

DONALD P. BEAMER.